United States Patent
Huang

(10) Patent No.: US 9,249,822 B2
(45) Date of Patent: Feb. 2, 2016

(54) SCREWS

(71) Applicant: Shu Chin Huang, Kaohsiung Hsien (TW)

(72) Inventor: Shu Chin Huang, Kaohsiung Hsien (TW)

( * ) Notice: Subject to any disclaimer, the term of this patent is extended or adjusted under 35 U.S.C. 154(b) by 0 days.

(21) Appl. No.: 14/270,360

(22) Filed: May 6, 2014

(65) Prior Publication Data

US 2015/0322991 A1 Nov. 12, 2015

(51) Int. Cl.
*F16B 35/04* (2006.01)

(52) U.S. Cl.
CPC .................................. *F16B 35/041* (2013.01)

(58) Field of Classification Search
CPC ..................................................... F16B 35/041
USPC ................................................... 411/412, 413
See application file for complete search history.

(56) References Cited

U.S. PATENT DOCUMENTS

| | | | | |
|---|---|---|---|---|
| 2,382,019 | A | * | 8/1945 | Miller ........................ 411/378 |
| 5,779,417 | A | * | 7/1998 | Barth et al. .................. 411/412 |
| 6,045,312 | A | * | 4/2000 | Hsing ......................... 411/412 |
| 6,185,896 | B1 | * | 2/2001 | Roberts et al. ................. 52/537 |
| 6,966,737 | B2 | * | 11/2005 | McGovern et al. ............ 411/413 |
| 7,070,376 | B1 | * | 7/2006 | Toback ........................ 411/82.2 |
| 2007/0160440 | A1 | * | 7/2007 | Langewiesche .............. 411/386 |
| 2008/0014047 | A1 | * | 1/2008 | Dohi ........................ 411/387.4 |

\* cited by examiner

*Primary Examiner* — Gary Estremsky

(57) ABSTRACT

A screw comprises an enlarged head; a large diameter screw rod having one end extending from the enlarged head; a small diameter screw rod having one end extending from another end of the large diameter screw rod; another end of the small diameter screw rod being formed as a tip end; a first thread extending from the large diameter screw rod and the small diameter screw rod; and the first thread extending to the tip end of the small diameter screw rod. A diameter of the first thread on the large diameter screw rod is large than that of the first thread on the small diameter screw rod. A pitch of the first thread on the large diameter screw rod is smaller than or equal to that of the first thread on the small diameter screw rod.

4 Claims, 2 Drawing Sheets

SCREWS

FIELD OF THE INVENTION

The present invention relates to screws by which in drilling, the dregs can be removed smoothly and quickly. No dreg is retained in the screwing hole. The screw can be firmly secured to a wall or an object.

BACKGROUND OF THE INVENTION

Generally, screws are made of different material, such as woods, plastics, metals, compound materials, etc. so as to have the effects of drilling speeds, dregs removing, and retaining.

Many design ways are used in designs of screws, such as single section, double sections, single thread, double threads, single diameter, double diameters, single pitch angle, double pitch angles, etc. All these designs presents different effects in use of screws.

SUMMARY OF THE INVENTION

Accordingly, the object of the present invention is to provide a screw, by which in drilling, the dregs can be removed smoothly and quickly. No dreg is retained in the screwing hole. The screw can be firmly secured to a wall or an object.

To achieve above object, the present invention provides a screw comprising: an enlarged head; a large diameter screw rod having one end extending from the enlarged head; a small diameter screw rod having one end extending from another end of the large diameter screw rod; another end of the small diameter screw rod being formed as a tip end; a first thread extending from the large diameter screw rod and the small diameter screw rod; and the first thread extending to the tip end of the small diameter screw rod; and wherein a diameter of the first thread on the large diameter screw rod is large than that of the first thread on the small diameter screw rod.

A pitch of the first thread on the large diameter screw rod can be smaller than that of the first thread on the small diameter screw rod.

Moreover, a second thread is formed on the large diameter screw rod; thus both first thread and the second thread is formed on the large diameter screw rod; the second thread is alternatively arranged with the first thread on the large diameter screw rod; and a pitch between the first thread on the large diameter screw rod and the third thread is smaller than that of the first thread on the small diameter screw rod.

Or a second thread is formed on the small diameter screw rod; the second thread is alternatively arranged with the first thread on the small diameter screw rod.

Or a pitch of the first thread on the large diameter screw rod is equal to that of the first thread on the small diameter screw rod.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
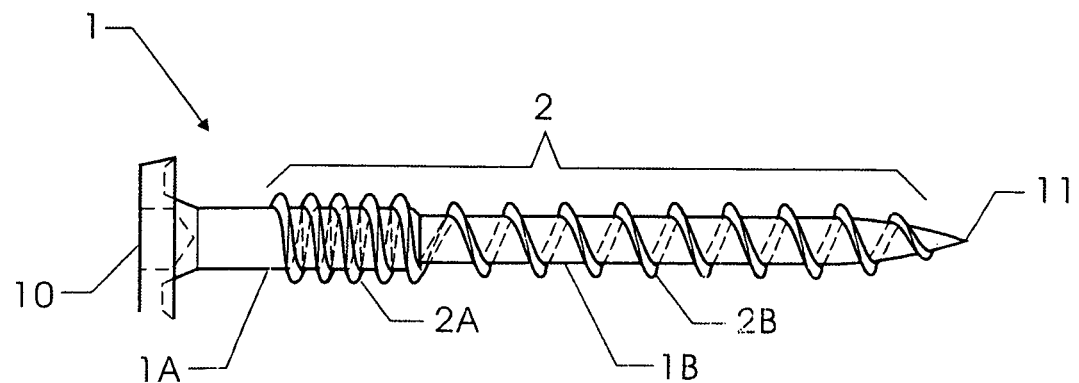
FIG. 1 is a cross sectional view about the first embodiment of the present invention.

Referring to FIG. 1, the first embodiment of the present invention is illustrated. The screw in this embodiment includes the following elements.

An enlarged head 10 is included.

A large diameter screw rod 1A has one end extending from the enlarged head 10;

A small diameter screw rod 1B has one end extending from another end of the large diameter screw rod. Another end of the small diameter screw rod 1B is a tip end.

A first thread 2 extends from the large diameter screw rod 1A and the small diameter screw rod 1B. A part of the thread 2 on the large diameter screw rod 1A is called as a rear thread 2A and a part of the thread 2 on the small diameter screw rod 1A is called as a front thread 2B.

A diameter of the rear thread 2A on the large diameter screw rod 1A is larger than that of the front thread 2B on the small diameter screw rod 1B; and the pitch of the rear thread 2A is larger than that of the front thread 2B.

Figure 2:
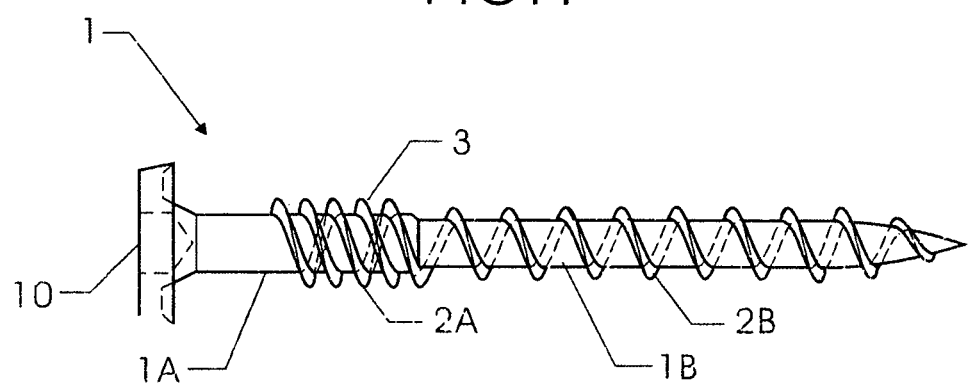
FIG. 2 is a cross sectional view about the second embodiment of the present invention.

With reference to FIG. 2, the second embodiment of the present invention is illustrated. The second embodiment is identical to that in the first embodiment, while a thread 3 is formed on the large diameter screw rod 1A. Thus both rear thread 2A and the thread 3 are formed on the large diameter screw rod 1A. The thread 3 is alternatively arranged with the rear thread 2A.

Figure 3:
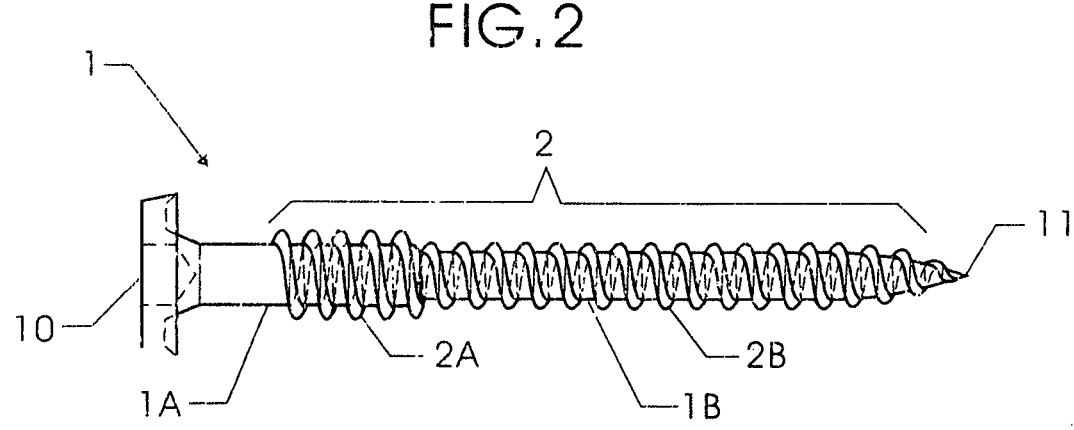
FIG. 3 is a cross sectional view about the third embodiment of the present invention.

With reference to FIG. 3, the third embodiment of the present invention is illustrated. The screw in this embodiment includes the following elements.

An enlarged head 10 is included.

A large diameter screw rod 1A has one end extending from the enlarged head 10;

A small diameter screw rod 1B has one end extending from another end of the large diameter screw rod. Another end of the small diameter screw rod 1B is a tip end.

A thread 2 extends from the large diameter screw rod 1A and the small diameter screw rod 1B. A part of the thread 2 on the large diameter screw rod 1A is called as a rear thread 2A and a part of the thread 2 on the small diameter screw rod 1A is called as a front thread 2B.

A diameter of the rear thread 2A on the large diameter screw rod 1A is smaller than that of the front thread 2B on the small diameter screw rod 1B and the pitch of the rear thread 2A is equal than that of the front thread 2B.

Figure 4:
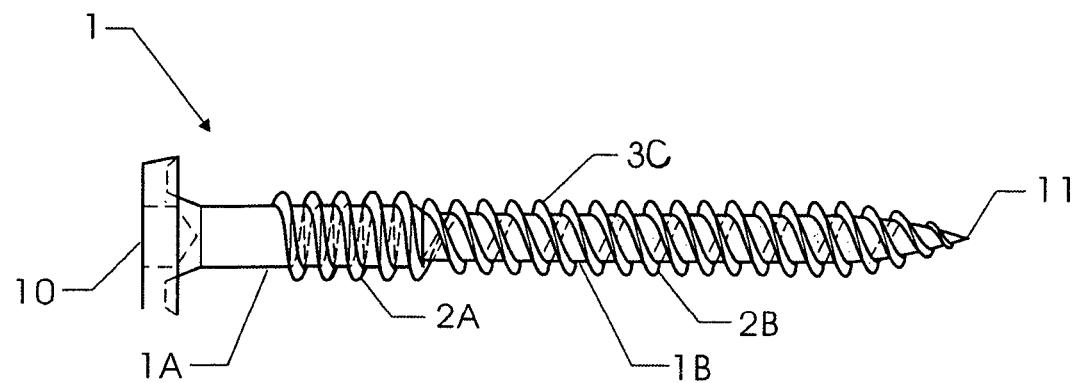
FIG. 4 is a cross sectional view about the fourth embodiment of the present invention.

With reference to FIG. 4, the fourth embodiment of the present invention is illustrated. The fourth embodiment is identical to that in the first embodiment, while third thread 3C is formed on the small diameter screw rod 1B. The third thread 3C is alternatively arranged with the thread 2B.

Figure 5:
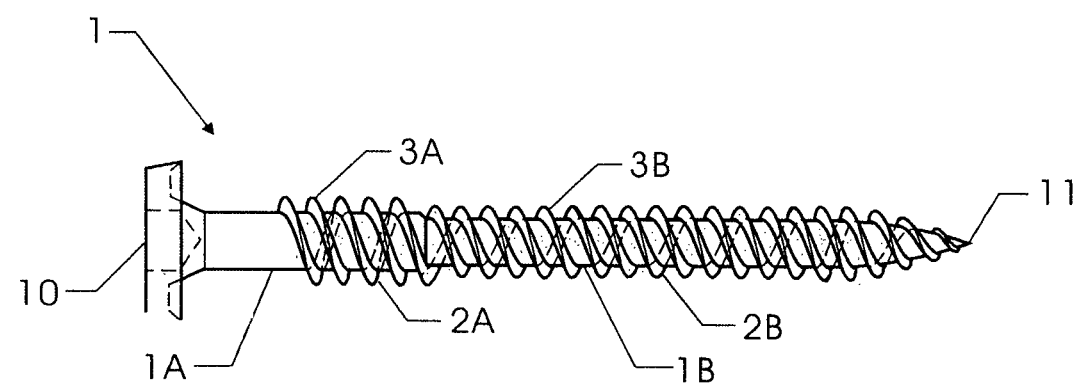
FIG. 5 is a cross sectional view about the fifth embodiment of the present invention.

With reference to FIG. 5, the fifth embodiment of the present invention is illustrated. The second embodiment is identical to that in the third embodiment, while a rear thread 3A is formed on the large diameter screw rod 1A and a front thread 3B is formed in the small diameter screw rod 1B. Diameters of the threads 2A and 3A on the large diameter screw rod 1A are larger than those of the threads 2B and 3B on the small diameter screw rod 1B; and the pitches of the threads 2A and 3A are smaller than those of the threads 2B and 3B.

Thus, by above mentioned structures, the dregs can be removed in drilling smoothly and quickly. No dreg is retained in the screwing hole. The screw can be firmly secured to a wall or an object.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A screw comprising:
   an enlarged head (10);
   a large diameter screw rod (1A) having one end extending from the enlarged head;
   a small diameter screw rod (1B) having one end extending from another end of the large diameter screw rod (1A); another end of the small diameter screw rod (1B) being formed as a tip end;
   a first thread (2) extending from the large diameter screw rod (1A) and the small diameter screw rod; and the first thread (2) extending to a tip end of the small diameter screw rod (1B); and
   wherein a diameter of the first thread (2) on the large diameter screw rod (1A) is larger than that of the first thread on the small diameter screw rod (1B); and
   wherein a pitch of the first thread (2) on the large diameter screw rod (1A) is smaller than that of the first thread (2) on the small diameter screw rod (1B).

2. The screw as claimed in claim 1, wherein a second thread (3) is formed on the large diameter screw rod (1A); thus both first thread (2) and the second thread (3) are formed on the large diameter screw rod (1A); the second thread (3) is alternatively arranged with the first thread (2) on the large diameter screw rod (1A); and a pitch between the first thread (2) on the large diameter screw rod (1A) and the second thread (3) is smaller than that of the first thread (2) on the small diameter screw rod (1B).

3. The screw as claimed in claim 1, wherein a third thread (3C) is formed on the small diameter screw rod (1B); the third second thread (3C) is alternatively arranged with the first thread on the small diameter screw rod (1B).

4. The screw as claimed in claim 1, wherein a pitch of the first thread on the large diameter screw rod is equal to that of the first thread on the small diameter screw rod.

* * * * *